United States Patent Office 3,557,622
Patented Jan. 26, 1971

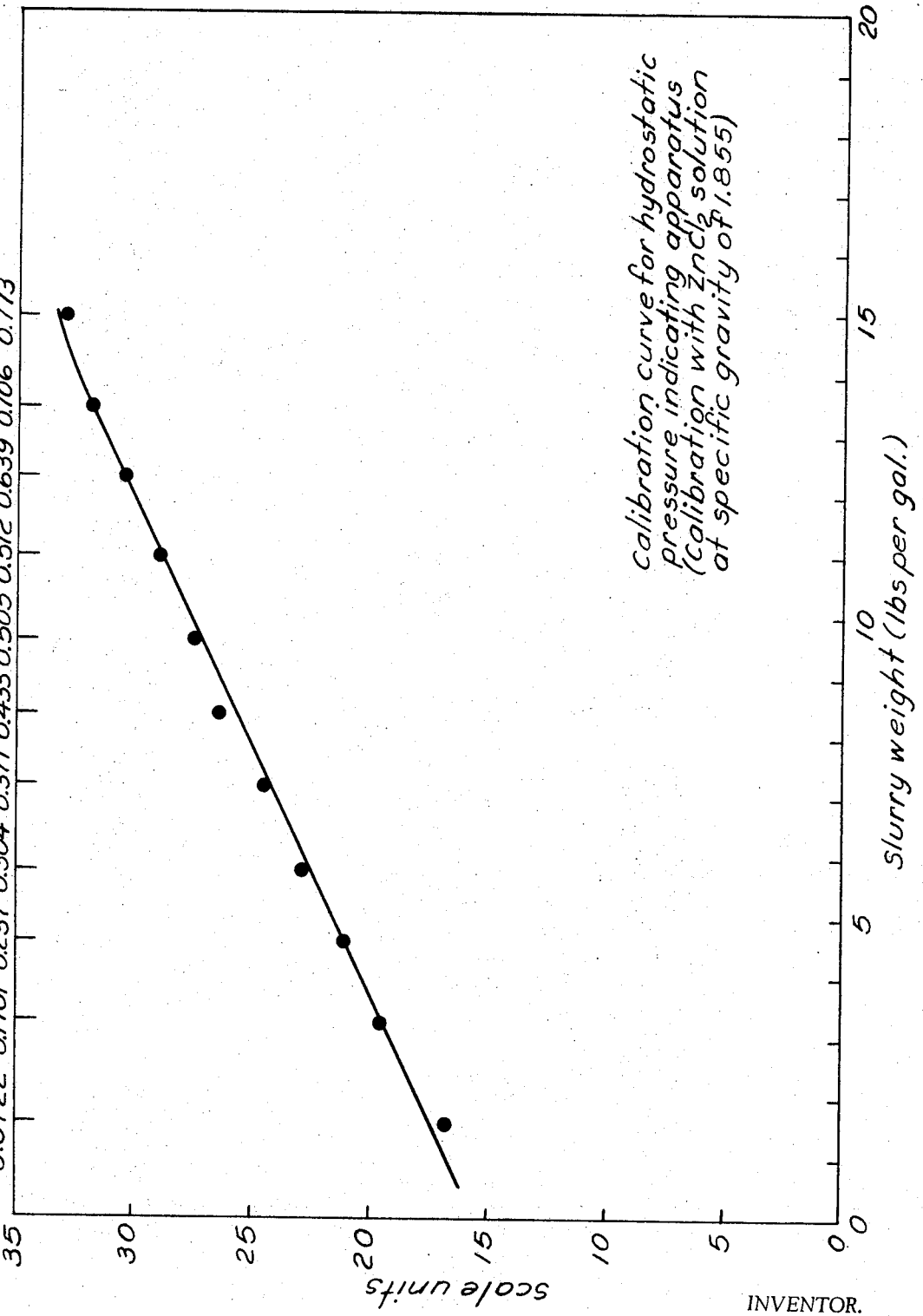

3,557,622
APPARATUS FOR MEASURING HYDROSTATIC
PRESSURE OF LIQUID COMPOSITIONS
Lloyd B. Spangle, Tulsa, Okla., assignor to The Dow
Chemical Company, Midland, Mich., a corporation of
Delaware
Filed Apr. 21, 1969, Ser. No. 817,745
Int. Cl. G07l 7/00
U.S. Cl. 73—406　　　　　　　　　　　　　　6 Claims

ABSTRACT OF THE DISCLOSURE

An apparatus is provided for accurately measuring hydrostatic pressure of slurry compositions which exhibit "self-supporting" characteristics, such as certain hydraulic cement slurries used in oil wells. The measuring device is basically an open end cylindrical container which is divided into upper and lower compartments by a liquid-impermeable diaphragm member. The slurry being measured for hydrostatic pressure is held in a static state in the upper compartment. The lower compartment contains a liquid, such as water, which is capable of being displaced by the pressure of the slurry on the diaphragm member. The water is temporarily retained in the lower compartment by a disc held flush against the base end of the container by a spring under compression. Gradual decompression of the spring to a point at which the downward hydrostatic pressure of the slurry overcomes the upward force exerted by the spring allows a small amount of water to seep under the base end of the container. This point, which is registered on a scale by an indicator activated by the spring, determines the true hydrostatic pressure of the slurry composition.

BACKGROUND OF THE INVENTION

The invention relates broadly to measurement of the hydrostatic pressure of hydraulic cement slurries and/or other pumpable materials. More specifically, the invention relates to apparatus for determining the hydrostatic pressure of cement slurries which do not exhibit a "true" hydrostatic head pressure at the base of the slurry column.

Some conventional hydraulic cement slurries are compositions having a relatively low solids-to-water ratio which require an undesirable length of time to set up when pumped into a wellbore. Because of these properties the slurries exert a high hydrostatic pressure within the wellbore, which creates problems such as fracture of the producing formation and seepage of the slurry into potable water supplies. Attempts to overcome these problems have produced improved hydaulic cement slurries having a high solids-to-water content, but which exhibit a low initial viscosity and which gel to a "self-supporting" solid in the wellbore in a very short time. Compositions of this type, which are generally referred to in the art as high gel strength slurries, are more specifically described in U.S. patent application Ser. No. 749,683, filed Aug. 2, 1968, and copending herewith.

Because of the highly fluid nature of the slurries presently used it is common practice to calculate the hydrostatic head pressure of such compositions by the known procedures used for true liquid compositions, i.e. a calculation based on the height of the fluid column and the density of the composition. In the case of a true fluid, if the height of the liquid column is not known, the hydrostatic head pressure may be determined by transferring a quantity of the fluid to a manometer or to a container equipped with a pressure gauge. Measurement of the hydrostatic pressure with either a pressure gauge or manometer involves movement of the fluid. Although such methods will give acceptable calculation of the hydrostatic pressure of highly fluid slurries, they are unsatisfactory for determining hydrostatic pressures of high gel strength slurries. Because of the "self- supporting" characteristics of the high gel strength slurries, they do not behave like true fluids, i.e. the "true" weight of the slurry (hydrostatic pressure) is not exerted at the base of the slurry column. The actual hydrostatic pressure is somewhat less than that for the same quantity of a true fluid. To obtain an accurate determination of the hydrostatic pressure of the rapid-gelling slurries, therefore, it is essential that the slurry column remain in a static state during the measurement.

SUMMARY OF THE INVENTION

A broad object of the invention is to provide an apparatus for measuring hydrostatic pressure of a liquid composition.

A more specific object of the invention is to provide an apparatus useful for determining hydrostatic pressure of liquid compositions which do not exert the "true" hydrostatic head pressure of a liquid composition.

A still more specific object of the invention is to provide an apparatus for measuring the hydrostatic pressure of hydraulic cement slurries having high gel strength, the slurry being maintained in the apparatus in a static state to thereby obtain an accurate pressure measurement.

Broadly stated, the invention provides an apparatus for measuring hydrostatic pressure of liquid compositions. Basically, the apparatus comprises a container means with a diaphragm member positioned therein which divides the container into an upper compartment and lower compartment. The upper compartment is adapted to contain a liquid composition to be measured for hydrostatic pressure and to maintain the liquid in a static state during such measurement. The lower compartment is adapted to contain a liquid composition which is displaceable from the lower compartment by the hydrostatic pressure exerted by the static liquid composition, as transmitted through the diaphragm member. A displaceable closure means, which covers the base of the container means, is adapted to temporarily retain the displaceable liquid in the lower compartment of the container means. The displaceable closure means is held in place against the base of the container means (until displaced therefrom by hydrostatic pressure of the static liquid) by a compressible member, one end of the member being in biasing contact with the closure means and the opposite end being carried on a support means positioned below the container means. The support means also carries an indicator means in operative contact with the compressible member, the indicator means being responsive to force directed against the compressible member, as represented by the hydrostatic pressure of the static liquid composition. A scale means is positioned adjacent to the indicator means and in operative association therewith. Graduations inscribed on the scale means are indicative of the hydrostatic pressure of the static liquid composition, as determined by registry of the indicator means with the graduations.

BRIEF DESCRIPTION OF THE DRAWINGS

FIG. 2 is a graph illustrating calibration of the apparatus of FIG. 1 using a liquid composition having a known density.

Figure 1:
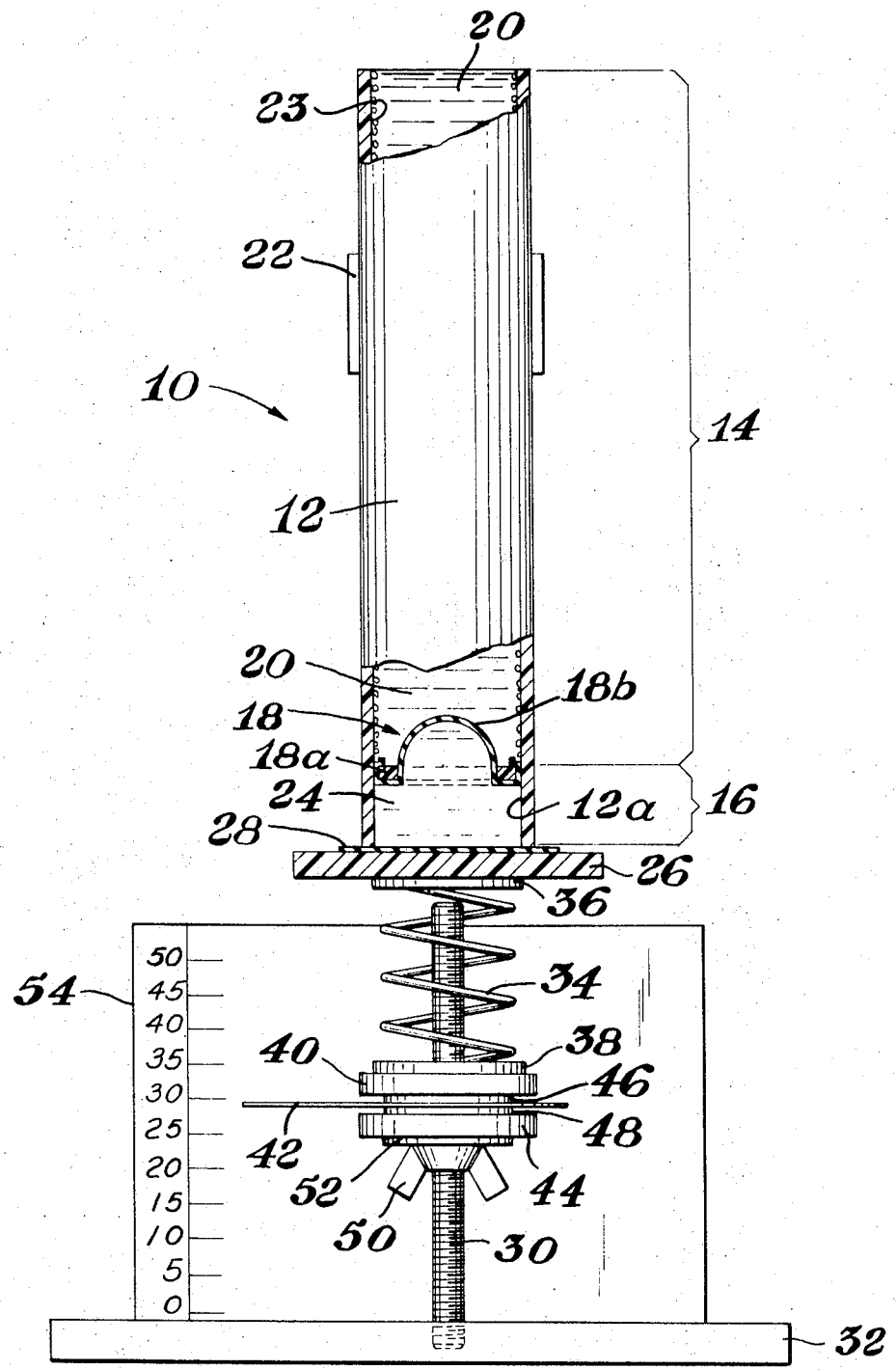
FIG. 1 is a front elevation view, partly in section, of an apparatus for measuring hydrostatic pressure of liquid compositions, according to a preferred embodiment of the invention.

The drawing illustrates only one of numerous embodiments within the scope of the invention, the form shown being selected for convenient illustration and clear demonstration of the principles involved.

DESCRIPTION OF A PREFERRED EMBODIMENT

Referring to FIG. 1 of the drawing the numeral 10 designates generally an apparatus for measuring hydrostatic pressure of a liquid composition according to a preferred embodiment of the invention. A container means of the apparatus 10 consists of a generally cylindrical or tubular container 12, preferably fabricated of a substantially transparent material such as a clear plastic. The container 12 is divided into an upper compartment 14 and lower compartment 16 by a diaphragm member 18 positioned within the container near the base thereof. Diaphragm member 18 is more specifically defined by a plastic ring 18a, of slightly smaller diameter than the inner diameter of container 12, and a thin rubber membrane 18b. Membrane 18b is stretched over the ring 18a and wedged between the periphery of the ring and the inner wall 12a of container 12, to provide a liquid-impermeable seal between the upper compartment 14 and lower compartment 16 of the container.

The upper compartment 14 of container 12 provides means for containing a liquid composition 20, such as a hydraulic cement slurry, in a static state for the purpose of determining the hydrostatic head pressure of the slurry. To maintain the slurry 20 in the desired static state, the container 12 is held in a stationary position and at a substantially vertical attitude by a clamp 22, which forms a part of a conventional ring-stand assembly (not shown). A layer of sand particles 23 is adhered to the inner wall 12a of compartment 14 in container 12 to simulate the earthen wall of a wellbore. The sand layer thus approximates the environment encountered by the cement slurry 20 as it is pumped into an actual borehole.

The lower compartment 16 of container 12 provides means for containing a liquid composition 24, preferably water, which may be displaced from compartment 16 by the hydraulic head pressure exerted by the slurry 20. A flat, solid, plastic disc 26, positioned in unattached contact with and covering the entire base edge of container 12, provides a closure member adapted to temporarily retain the displaceable liquid in the compartment 16. A thin rubber gasket 28 may be sandwiched between the base edge of container 12 and disc 26 to provide an improved seal against liquid seepage from compartment 16 during operation of the apparatus 10. It will be understood, however, that the gasket 28 is not required for normal operation of the present apparatus.

Closure disc 26 is held against the base of container 12 by compressive force of a coil spring 34 bearing against the underside of the disc. Support means for the spring 34 is defined by an upstanding threaded stud 30, which is positioned below and in axial alignment with the container. The lower end of stud 30 is mounted in a base plate 32 and the upper end thereof terminates at a point below the closure disc 26 on container 12. The upper end of spring 34 is held against disc 26 by a first spring retainer 36, as defined by a cup-shaped plastic washer secured to the underside of the disc. An identical cup shaped washer, which defines a second spring retainer 38, is carried on the stud 30 to provide a seat for the lower end of spring 34. The spring retainer washer 38 is, in turn, seated on a first roller bearing 40 carried on stud 30. A pointer member 42, as defined by a thin plastic sheet, is positioned on stud 30 between the first bearing 40 and the second roller bearing 44. A flat washer 46 provides a first spacer member between pointer 42 and bearing 40. An identical flat washer 48 provides a second spacer member between pointer 42 and bearing 44.

The displaceable liquid 24 (water) is retained in compartment 16 of container 12 by compression of spring 34 against closure disc 26. Decompression of spring 34 to a point where the hydrostatic pressure of slurry 20 overcomes the compressive force of the spring displaces a small quantity of the liquid from compartment 16. Compression or decompression of spring 34 is achieved by upward or downward rotation of a wing nut 50, which is threaded onto the stud 30 below the bearing 44. A third spaced member, as defined by a flat washer 52, may be inserted between wing nut 50 and bearing 44 to provide better seating of the bearing against the nut. The spacer member 52, however, is not required for normal operation of the present apparatus. Means for measuring the hydrostatic pressure exerted by the slurry 20 is provided by a scale 54 supported on the base plate 32 and positioned adjacent to the pointer 42. Scale 54 is provided by a card with graduations (numerals) inscribed thereon which represent arbitrary units defining hydrostatic pressure. The hydrostatic pressure of a given slurry is thus indicated by registry of the pointer 42 with an appropriate unit (numeral) on the scale.

In a typical operation of the apparatus 10 the device is calibrated by using a liquid composition heavy enough (i.e. with sufficient density) to correctly measure hydrostatic pressure exerted by the heaviest cement slurries commonly employed in cementing oil well boreholes. The heavier slurries, for example, may have an absolute density of up to about 20 pounds per gallon of slurry. An aqueous solution of zinc chloride (specific gravity 1.855) was used as the calibration solution. The calibration solution was prepared by dissolving 1,205 grams of $ZnCl_2$ in 1,000 milliters of water.

The calibration procedure is as follows. The container 12 is inverted and compartment 16 is filled to overflowing with tap water (liquid 24). Closure disc 26 is placed over the base edge of container 12 and held snugly in place while the upper end of spring 34 is fitted into the retainer 36. The assembled container, closure disc and spring are turned right side up and lowered over the stud 30 to seat the lower end of the spring in retainer 38. Once the spring is seated in retainer 38, the container is clamped in a stationary position, at an exact height above base plate 32, with clamp 22. Wing nut 50 is then turned upwardly on stud 30 far enough to compress the spring against the closure disc with sufficient force to prevent the water in compartment 16 from leaking out of the container.

The container is then filled completely to the top with the $ZnCl_2$ calibration solution. The wing nut is turned downwardly on the stud to decompress the spring to a point where the hydrostatic pressure exerted by the calibration solution overcomes the upward (compressive) force of the spring. At this point the pressure of the calibration solution against the water in compartment 16, as transmitted through the rubber membrane 18b, will push the closure disc downwardly and force a small amount of the water to leak under the base edge of the container and onto the disc. When the leakage occurs the position registered by the pointer 42 on scale 54 establishes a reference point on the scale. The numeral on the scale which corresponds to the reference point can then be used as an arbitrary unit indicative of the hydrostatic pressure exerted by the calibration solution, as determined by the height of the solution column in the container and the density of the composition. By repeating the above procedure, using the same calibration solution (which has a known density), but by varying the height of the solution column in the container, a calibration curve for the spring may be computed, as illustrated by the graph in FIG. 2.

In the graph of FIG. 2 the units on the vertical axis (scale units) are designated by the numerals inscribed on scale 54. The figures on the upper horizontal axis (pressure at base of slurry column) designate the hydrostatic pressure exerted at the base of a column of liquid of known height and density, in this case, the calibration solution. The figures across the lower horizontal axis (slurry weight) correspond to the hydrostatic pressure units of the upper axis, but are expressed as the weight (density) of a liquid composition which will exert the same amount of hydrostatic pressure. Use of the graph of FIG. 2, in conjunction with the apparatus 10, thus enables the technician to readily determine the "true" weight exerted by a cement slurry.

In the practice of the invention, the utility of the apparatus 10 was demonstrated by determing the hydrostatic pressure of various hydraulic cement slurries, each having a different composition. The following examples describe the procedure followed and the results obtained. It will be understood that the examples are intended only to illustrate the invention and not to limit the scope to the procedure described herein.

Example I

A composition represntative of a conventional cement slurry, having a calculated absolute density of about 14.9 lbs./gallon, was made up by admixing 800 gms. portland cement and 280 gms. of silica flour with 552 ml. of water. The mixture was thoroughly stirred for about 15 minutes in a conventional household blender. The mixture was then poured into the upper compartment 14 of the container 12, using a sufficient quantity of slurry to fill the upper compartment completely. Wing nut 50 was slowly turned downwardly on stud 30 until water began to leak out of the base of the container onto the closure disc 26. At this point the position of pointer 42 on the scale card 54 was at about 32.5 units. Reference to the graph of FIG. 2 indicates that a reading of 32.5 on the unit scale corresponds to a slurry weight of about 14.9 lbs./gallon. The pressure measurement thus obtained indicated that this slurry composition was exerting its full or "true" weight at the base of the slurry column.

Example II

A second composition, also representative of a conventional slurry having an absolute density calculated at about 14.9 lbs./gallon, was prepared. The composition was made up by admixing 600 gms. portland cement and 400 gms. of pozzolan with 394 ml. of water. The composition was stirred and charged to the container 12 according to the procedure described in Example I. A reading of the pressure exerted by the slurry was obtained in the manner described in Example I and found to be about 30 units on the scale card 54. Referring to the graph of FIG. 2, a reading of 30 units corresponds to a slurry weight of about 11.8 lbs./gallon. The measurement thus obtained indicated that this composition was exerting somewhat less hydrostatic pressure (weight) than the calculated value would indicate.

Example III

A third composition, representative of the high gel strength slurries described in U.S. application Ser. No. 749,683, but with a calculated absolute density of about 14.9 lbs./gallon, was prepared according to the procedure of Example I. The composition consisted of 800 gms. portland cement, 96 gms. gypsum anhydrite and 24 gms. calcium chloride, which were admixed with 480 ml. of water. The slurry was charged to the container 12 and the pressure exerted by the composition was determined in the same manner described in Example I. The pressure reading on scale card 54 was about 25 units, which corresponds to a slurry weight of about 7.6 lbs./gallon, as determined from the graph of FIG. 2. The pressure exerted by the composition of this example, which is substantially less than the calculated value indicates, is typical of the reduced pressure exerted by high gel strength slurries, as mentioned hereinabove.

What is claimed is:

1. Apparatus for measuring hydrostatic pressure of a slurry composition, which comprises:
   (A) a cylindrical container having an open upper end and an open base end;
   (B) a liquid-impermeable of diaphragm member which is positioned within the container to divide the container into an upper compartment and a lower compartment, wherein:
      (1) the upper compartment is adapted to contain a slurry composition to be measured for hydrostatic pressure;
      (2) the lower compartment is adapted to contain a liquid composition displaceable from said lower compartment by hydrostatic pressure of the slurry composition;
   (C) clamping means which engage and hold the container in a stationary position and at a substantially vertical attitude to thereby maintain the slurry composition in a static state during measurement thereof;
   (D) a closure member for the base end of the container which:
      (1) is unattached to and covers the entire base end of the container;
      (2) is displaceable from the base end of the container by hydrostatic pressure exerted by the liquid in the upper compartment of the container;
   (E) a first spring retainer member which is secured to the underside of the closure member;
   (F) support means for a compressible spring, a defined by an upstanding threaded stud member which:
      (1) is positioned below the container and in axial alignment therewith; and wherein
      (2) the lower end of the stud member is mounted in a base support plate;
      (3) the upper end of the stud member terminates at a point below the first spring retainer member; and wherein
      (4) the compressible spring is carried on the stud member and is engaged by the first spring retainer member and a second spring retainer member carried on the stud member; and wherein the apparatus further includes:
   (G) a first bearing member carried on the stud member and positioned between the second spring retainer member and a first spacer member carried on the stud member;
   (H) a threaded member carried on the stud member in threaded engagement therewith, said threaded member being positioned below and in biasing contact with the third spacer member;
   (I) a scale means which:
      (1) is positioned adjacent to the pointer member; and
      (2) is defined by a card carried on the base support plate, said card including graduations thereon indicative of the hydrostatic pressure of the static liquid composition, as determined by registry of the pointer with said graduations.

2. The apparatus of claim 1 in which the diaphragm member is defined by:
   (A) a ring positioned within said container, and
   (B) a rubber membrane adapted to be stretched over the ring and wedged between the inner container wall and the periphery of the ring.

3. The apparatus of claim 1 in which the closure member comprises a flat solid disc.

4. The apparatus of claim 1 in which the compressible spring is defined by a coil spring.

5. The apparatus of claim 1 in which the first and second spring retainer members comprise cup-shaped washers.

6. The apparatus of claim 1 in which the first bearing member and second bearing member are roller bearings.

References Cited

UNITED STATES PATENTS 3,285,061  11/1966  Hegenbart _____ 177—208X

LOUIS R. PRINCE, Primary Examiner

J. W. ROSKOS, Assistant Examiner

U.S. Cl. X.R.

177—208